United States Patent [19]

Lubinsky et al.

[11] Patent Number: 5,477,344
[45] Date of Patent: Dec. 19, 1995

[54] DUPLICATING RADIOGRAPHIC, MEDICAL OR OTHER BLACK AND WHITE IMAGES USING LASER THERMAL DIGITAL HALFTONE PRINTING

[75] Inventors: Anthony R. Lubinsky, Rochester; Richard N. Blazey, Penfield; William Mey; Charles D. DeBoer, both of Rochester, all of N.Y.

[73] Assignee: Eastman Kodak Company, Rochester, N.Y.

[21] Appl. No.: 154,837

[22] Filed: Nov. 19, 1993

[51] Int. Cl.$^6$ ............................. H04N 1/23; G03B 27/30
[52] U.S. Cl. ......................... 358/487; 358/297; 358/298
[58] Field of Search ...................... 358/456, 459, 358/487, 296, 298, 302, 494, 297; 348/64, 67, 77, 97, 98; 355/27, 32; H04N 1/04, 1/23; G03B 27/30

[56] References Cited

U.S. PATENT DOCUMENTS

| | | | |
|---|---|---|---|
| 3,720,784 | 3/1973 | Maydan et al. | 178/6.6 R |
| 3,768,906 | 10/1973 | Michelson et al. | 355/132 |
| 4,000,492 | 12/1976 | Willens | 346/1 |
| 4,023,185 | 5/1977 | Bloom et al. | 346/135 |
| 4,097,895 | 6/1978 | Spong | 358/128 |
| 4,285,056 | 8/1981 | Bell | 369/100 |
| 4,716,470 | 12/1987 | Levine | 358/527 |
| 4,875,074 | 10/1989 | Sangyoji et al. | 355/27 |
| 4,918,622 | 4/1990 | Granger et al. . | |
| 4,930,023 | 5/1990 | Yakame | 358/298 |
| 4,967,287 | 10/1990 | Nakatani | 358/401 |
| 4,973,572 | 11/1990 | DeBoer | 503/227 |
| 4,977,458 | 12/1990 | Granger et al. . | |
| 4,980,262 | 12/1990 | Thomas et al. | 430/141 |
| 5,097,342 | 3/1992 | Agano | 358/302 |
| 5,113,264 | 5/1992 | Isono et al. | 358/298 |
| 5,212,500 | 5/1993 | Harrigan et al. . | |
| 5,289,270 | 2/1994 | Hayashi | 358/527 |

FOREIGN PATENT DOCUMENTS 0564877  3/1993  European Pat. Off. .

OTHER PUBLICATIONS

Micromachining and Image Recording on Thin Films by Laser Beams, D. Maydan, The Bell System Technical Journal, vol. 50, No. 6, Jul.–Aug. 1971.

Primary Examiner—Scott A. Rogers
Assistant Examiner—Kim Yen Vu
Attorney, Agent, or Firm—William F. Noval

[57] ABSTRACT

Continuous tone black and white images are duplicated using laser thermal digital halftone printing. A continuous tone black and white image signal is provided by a source such as a medical imaging source. The image signal is screened with a digital halftone screen, such that each pixel of said image signal is represented by a predetermined matrix of micropixels, whereby to produce a digital halftone image signal corresponding to the continuous tone black and white image signal. A master is created by printing the digital halftone image onto a dye ablated medium by means of laser thermal recording. A duplicate of the master is produced by contact printing onto a duplicating medium.

18 Claims, 5 Drawing Sheets

DUPLICATING RADIOGRAPHIC, MEDICAL OR OTHER BLACK AND WHITE IMAGES USING LASER THERMAL DIGITAL HALFTONE PRINTING

FIELD OF THE INVENTION

This invention relates, in general, to the duplication of black and white images and, more particularly, to the duplication of radiographic, medical or other high quality black and white images using laser thermal digital halftone printing.

BACKGROUND OF THE INVENTION

In conventional film/screen radiography, a body part of a patient is exposed to x-rays to produce a latent x-ray image in film. The exposed film is processed and ready for viewing by a radiologist or other medical made diagnostician. In many cases, it is desirable to have more than one copy of an x-ray image available for use by other medical personnel, for archiving, for transmission to a remote location, etc.

One method of making duplicate copies of radiographs has been by contact printing on direct-positive duplicating film. Because of the difficult set of requirements on the duplicating film, i.e., high maximum density (D max), gamma=-1, and wide dynamic range, it has been difficult to obtain accurate and inexpensive copies by this method. Other contact printing techniques, such as the thermal duplicating technique disclosed in U.S. Pat. No. 3,768,906, issued Oct. 30, 1973, inventors Michelson, et al; and U.S. Pat. No. 4,967,287, issued Oct. 30, 1990, inventor Nakatani, do not have high enough quality to be useful in radiographic film duplication.

In the case of other medical imaging modalities, such as computerized tomography (CT), or magnetic resonance imaging (MRI), the image is acquired, digitized, and stored on a magnetic or optical storage medium (disk, tape). Such an image may be printed, e.g., on a laser film printer and the film developed in a film processor. Multiple duplicates can be made by repeating the process. In doing so, however, one is limited by the relatively slow throughput time of the laser film printer/processor.

Laser thermal recording of images by means of analog ablation and/or evaporation techniques are known in the production of optical records and the like. (See, e.g., U.S. Pat. No. 4,000,492, issued Dec. 28, 1976, inventor Willens; U.S. Pat. No. 4,023,185, issued May 10, 1977, inventors Bloom et al.; and U.S. Pat. No. 4,097,895, issued Jun. 27, 1978, inventor Spong.) The ablated record can then be used to produce duplicates by optical contact printing (See U.S. Pat. No. 4,980,262, issued Dec. 25, 1990, inventors Thomas et al.), or by impression contact printing (See U.S. Pat. No. 4,285,056, issued Aug. 18, 1981).

The method of halftone printing as a means of rendering continuous tone imagery using ablation recording on thin metal (e.g., bismuth) layers is disclosed in U.S. Pat. No. 3,720,784, issued Mar. 13, 1973, inventors Maydan et at. (See also: *Micromachining and Image Recording on Thin Films by Laser Beams,* by D. Maydan, The Bell System Technical Journal, Vol. 50, No. 6, July–August 1971.) A projection copy of the record can be made by photographic or electrophotographic techniques.

None of the duplication techniques referred to in the last two paragraphs are advantageous in making duplicates of radiographic film because of high cost, slow duplicating speed, and impracticality.

Therefore, a problem exists in the need for a fast, convenient, and/or inexpensive technique for making duplicate copies of continuous tone black and white medical, radiographic, and other high quality images.

SUMMARY OF THE INVENTION

According to the present invention, there is provided a solution to the problem of the prior art by providing an improved method and apparatus for making duplicate copies of continuous tone black and white medical, radiographic, and other high quality images which are fast, convenient, and inexpensive.

According to one aspect of the present invention, there is provided a method for duplicating continuous tone black and white images comprising the steps of:

providing a continuous tone black and white image signal including a matrix of pixels;

screening said black and white image signal with a digital halftone screener, such that each pixel of said image signal is represented by a predetermined matrix of micro-pixels, whereby to produce a digital halftone image signal corresponding to said continuous tone black and white image signal;

creating a master by printing said digital halftone image onto a dye coated medium by means of digital halftone laser thermal dye ablation recording; and producing a duplicate of said master by contact printing onto a duplicating medium.

According to another aspect of the present invention, there is provided apparatus for duplicating continuous tone black and white images comprising:

a source of a continuous tone black and white image including a matrix of pixels;

a screener for screening said black and white image signal with a digital halftone screen, such that each pixel of said image signal is represented by a predetermined matrix of micro-pixels, whereby to produce a digital halftone image signal corresponding to said continuous tone black and white image signal;

a printer for creating a master by printing said digital halftone image onto a dye coated medium by means of digital halftone laser thermal recording; and a duplicator for producing a duplicate of said master by contact printing onto a duplicating medium.

DESCRIPTION OF THE PREFERRED EMBODIMENTS

Although the invention will be described with specific reference to the duplication of medical and radiographic images through the use of a master produced by digital halftone laser thermal dye ablation recording, it will be understood that the present invention is useful in the duplication of any high quality and/or high resolution black and white images. Laser thermal recording techniques, other than laser dye ablation, can also be used.

Figure 1:
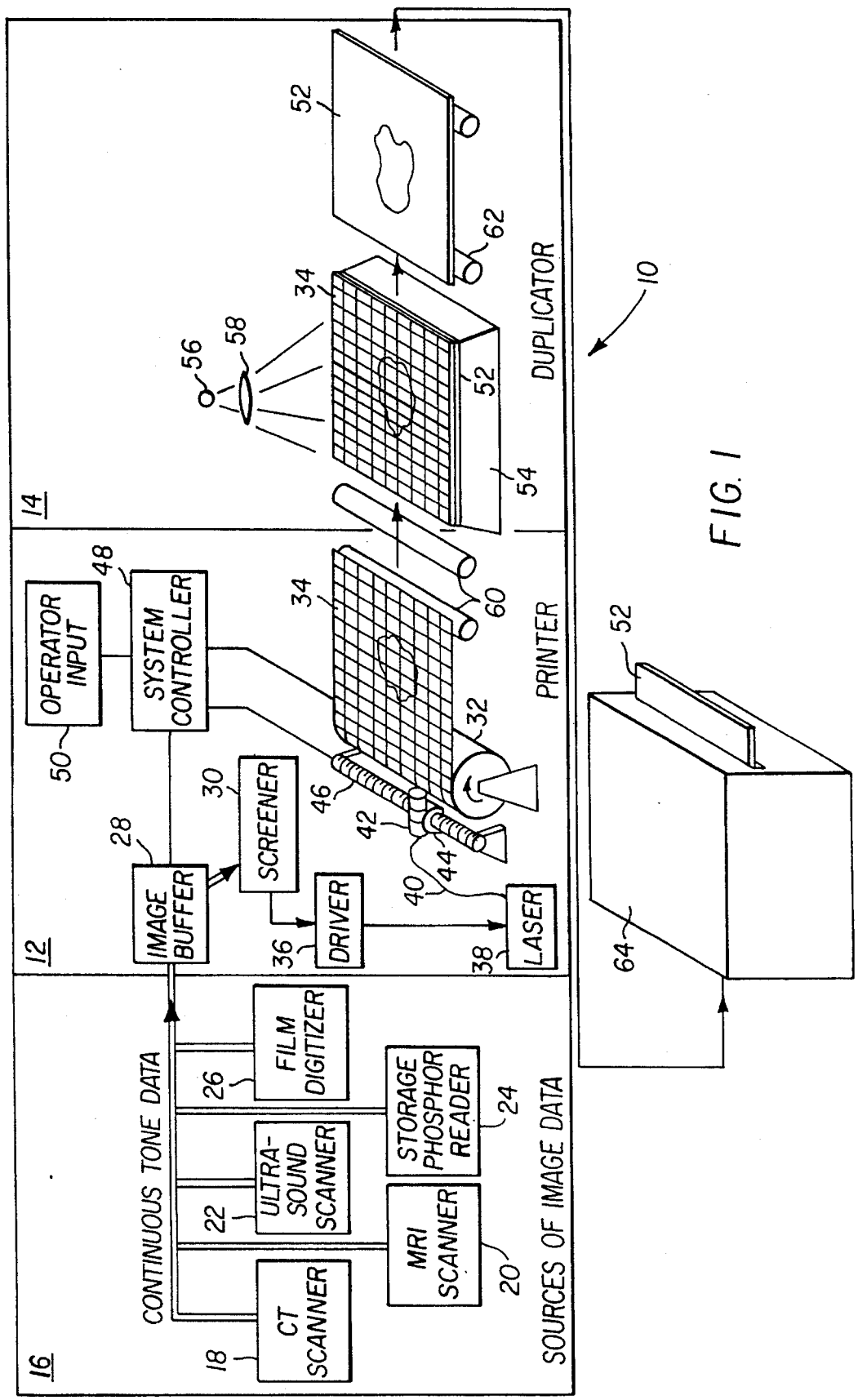
FIG. 1 is a partially block, partially diagrammatic view of an embodiment of the present invention.

Referring now to FIG. 1, there is shown an embodiment of the present invention. As shown, a digital halftone laser thermal printer/duplicator 10 includes a digital halftone laser thermal printer 12 and a duplicator 14. Printer 12 receives continuous tone black and white image signals from a source or sources 16 of such image signals. Sources 16 are medical imaging sources, such as diagnostic imaging modalities [e.g., CT (Computerized Tomography) scanner 18, MRI (Magnetic Resonance Imaging) scanner 20, ultrasound scanner (US) 22], a storage phosphor reader 24 (such as the Kodak Ektascan Storage Phosphor Reader, supplied by the Eastman Kodak Company, Rochester, New York), and a film digitizer 26 (such as a radiographic film digitizer).

Sources 16 produce a continuous tone, black and white image signal. The image signal is represented as a matrix of picture elements or pixels (e.g., 512×512), each pixel having a continuous tone gray level of a predetermined number of bits (e.g., an 8 bit image has levels from 0–255).

Figure 8:
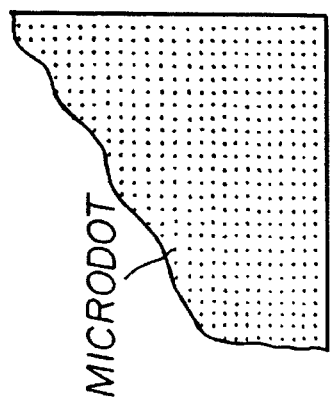
FIGS. 4, 7 and 8 are diagrammatic view useful in explaining digital halftone screening.
Figure 7:
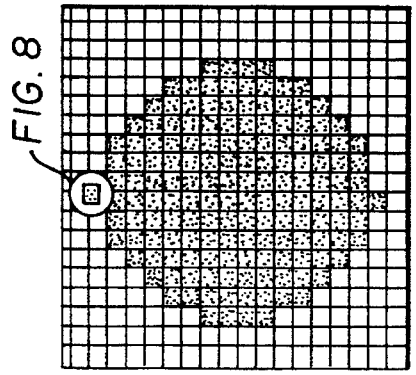
Figure 4:
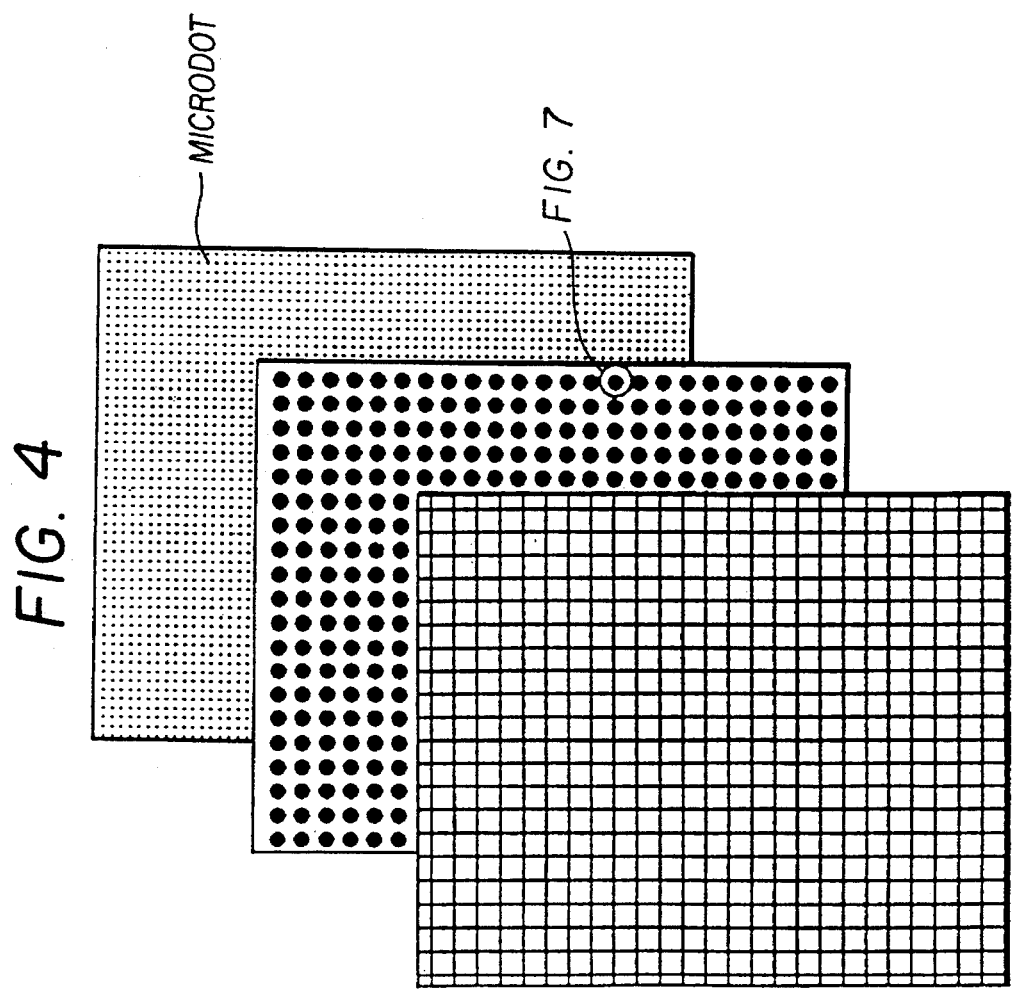

Printer 12 includes an image buffer 28 for storing one or more digital images from source(s) 16. The printer 12 includes a digital halftone screener 30 for converting each pixel of the continuous tone image into a halftone representation. FIG. 4 is a diagrammatic view illustrating the halftone screening process. The image from the digital image source is composed of a matrix of pixels having a gray level. Each pixel is processed by the halftone screen to convert the gray level pixel into a macrodot, having an area which is a function of the gray level. The macrodot is shown as center-weighted and is subdivided into a predetermined matrix of micro-pixels (e.g., 32× 32). In one case, each one of the micro-pixels has one of two values, 1 or 0. In another case, each one of the micro-pixels has one of three or more values. Each successive continuous tone gray level is represented by a particular pattern of black micro-pixels (halftone dots), with increasing shades of gray being rendered by increasing relative numbers, or relative area coverage, of black dots. A set of micropixel patterns is called a "font", and a specific subset of micropixels is called a "font slice". An exemplary font slice is illustrated in FIGS. 7 and 8. Suitable digital halftone screening techniques are disclosed in U.S. Pat. Nos. 4,918,622 and 4,977,458, inventors J. F. Hamilton and E. Granger.

In general, printer 12 prints the pattern of black and white micropixels representing each pixel of the black and white image by means of a laser dye ablation thermal imaging technique. The image is printed in a raster pattern on the dye ablation media by scanning the width of the media in a line scan and scanning the length of the media in a page scan perpendicular to the line scan.

Line and page scanning can be effected in a number of ways. As shown in FIG. 1, printer 12 includes a rotatable drum 32 about which is wrapped a sheet 34 coated with an ablative dye. The ablative dye can be black or any other color dye appropriate for the duplicating technique. As drum 32 rotates, it moves sheet 34 in a page scan direction. Line scan is effected as follows: The micropixel black or white signal value is applied to laser driver 36 which drives one or more diode lasers 38 (such as infrared diode lasers which emit light in the range of 780 nm.–880 nm.). Lasers 38 produce laser beams of light which are transmitted by optical fibers 40 to be focused by lens assembly 42 onto sheet 34. Lens assembly 42 is mounted on a carriage 44. Carriage 44 is driven by screw drive laterally across sheet 34 held on drum 32. When a line of pixels is printed on sheet 34, page scan is accomplished by rotating drum 32 one line at a time until the entire halftone image has been printed. System controller 48, having operator input 50, controls the operation of printer 12. System controller 48 may, for example, be a microprocessor controller. An exemplary laser imaging system is disclosed in commonly-assigned U.S. Pat. No. 5,212,500, issued May 18, 1993, inventors Harrigan et al.

Other methods of line and page scanning of media can also be used. For example, the media can be mounted on a translation mechanism which moves the media in a page direction while one or more laser beams are scanned across the media in a line scan. The laser beam scanner can be an oscillating mirror, a rotating polygon mirror, or a rotating hologon. Sources of light other than a laser may be used.

The digital halftone master produced by printer 12 is used in associated duplicator 14 to make high quality duplicates of the black and white image from source 16. Duplicator 14 can be any high quality duplicating apparatus. For example, as shown, duplicator 14 can be a contact type photographic duplicator in which a high contrast silver halide duplicating film 52 in contact with master sheet 34 is supported on table 54. Light from light source 56 is focused by lens 58 through sheet 34 to expose duplicating film 52. The exposed duplicate is then processed by well-known film processing techniques. Processor 64 develops the latent image and produces a final print.

Preferably, master sheet 34 is transported automatically between printer 12 and duplicator 14 by suitable transport means such as transport rollers 60. In like manner, the duplicate copy 52 can be transported by transport rollers 62 from duplicator 14 to processor 64.

Figure 5:
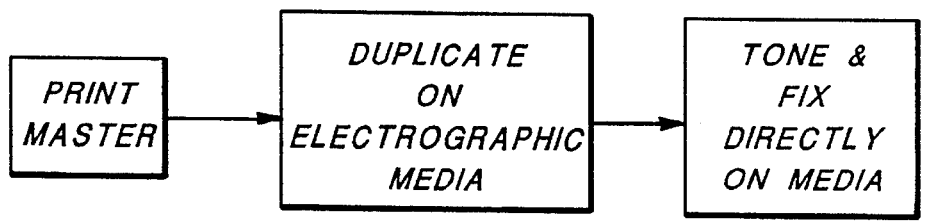
FIGS. 5 and 6 are block diagrams of respective alternative duplicating techniques.
Figure 6:
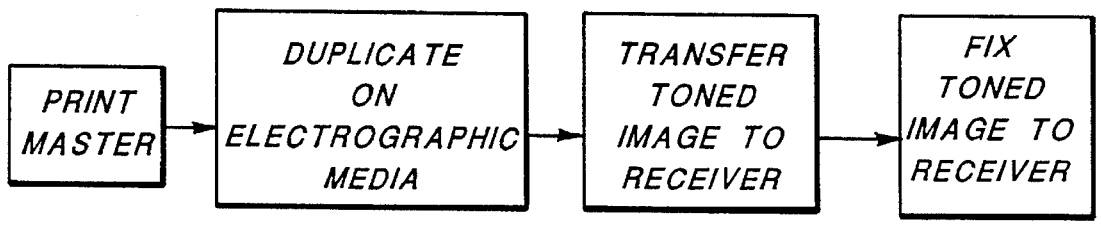

Duplicator 14 can also be a contact type electrophotographic duplicator in which electrophotographic media, such as photoconductive media in contact with master sheet 34 is exposed to light to produce a latent electrostatic image on the duplicate photoconductive media. The latent electrostatic image on the duplicate photoconductive media can be toned and fixed directly (see FIG. 5). Alternatively, the toned image can be transferred to a receiver to which it is fixed (see FIG. 6).

Figure 2:
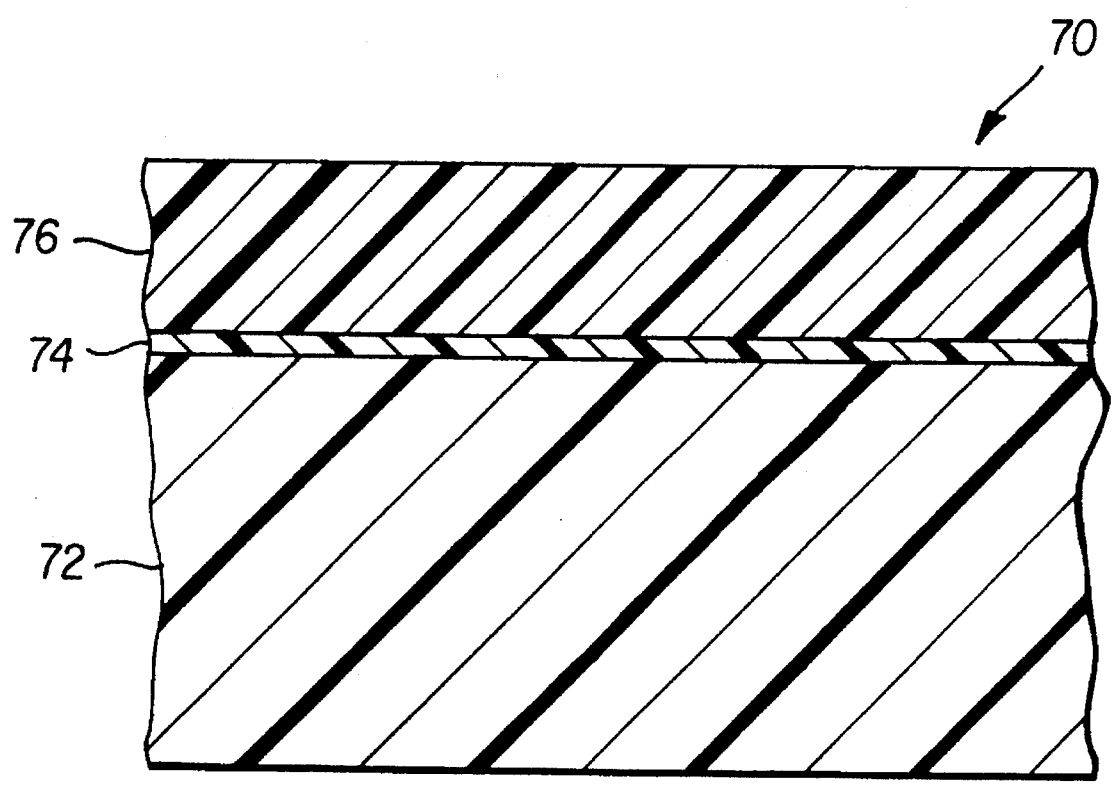
FIG. 2 is a cross-sectional view of laser dye ablation media which is useful as a master medium in carrying out the present invention.
Figure 3:
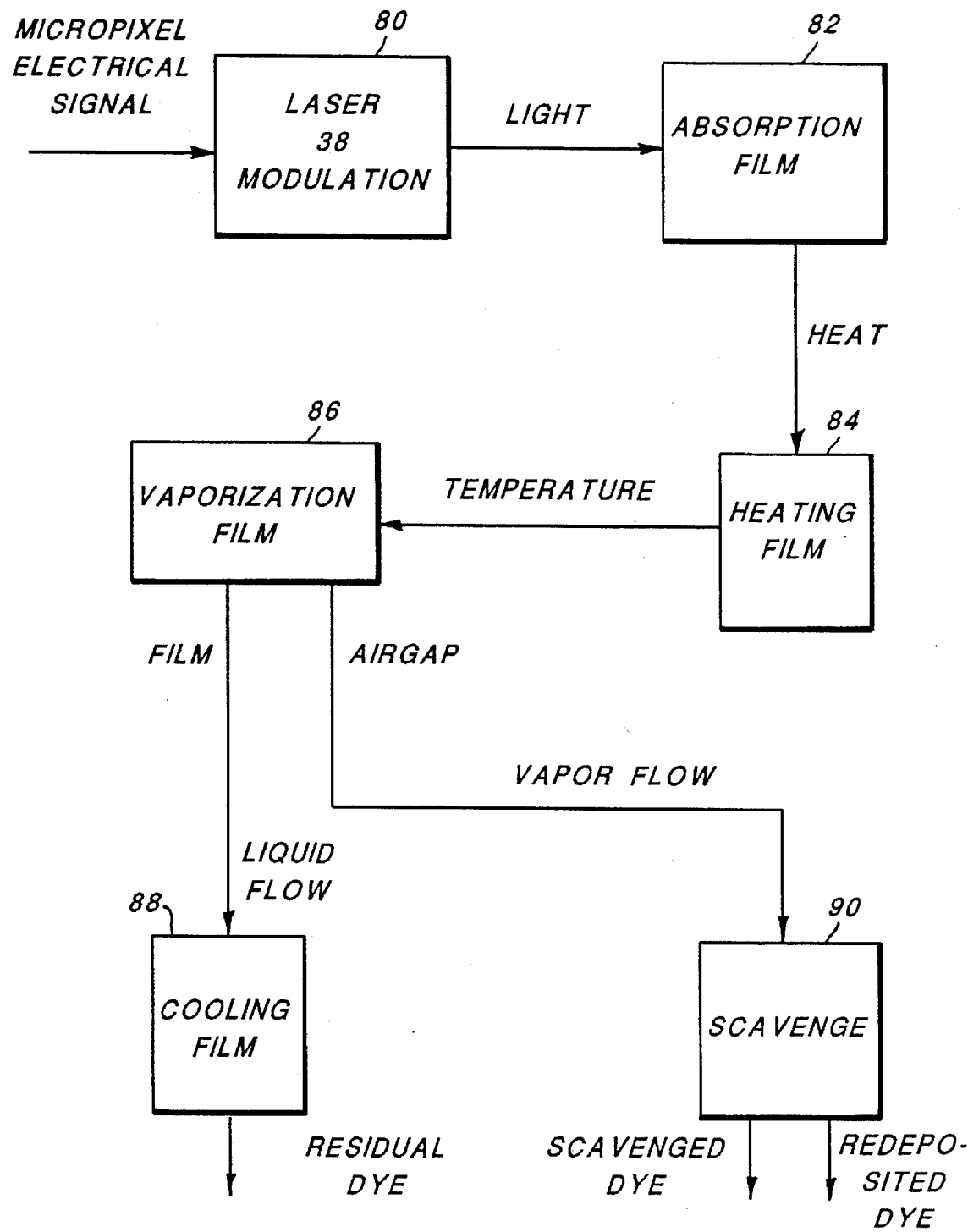
FIG. 3 is a process diagram of the laser thermal recording technique used in the embodiment of FIG. 1.

Referring now to FIGS. 2 and 3, there is described a preferred embodiment of the dye ablation thermal recording process. As shown in FIG. 2, the thermal recording master 70 includes a support layer 72 of polyester, a gel sub barrier layer 74, and a black dye ablation layer 76. Barrier layer 74 keeps dye from migrating into support layer 72. Black dye ablation layer 76 includes a black ablative dye in a suitable binder. The black dye is a neutral combination of cyan, magenta, and yellow image dyes (such as those disclosed in U.S. Pat. No. 4,973,572, issued Nov. 27, 1990, inventor DeBoer) together with an infrared absorbing dye. The infrared dye absorbs the infrared light from the diode laser and converts it to heat to locally evaporate the dye layer.

The laser thermal dye ablation recording process is illustrated in FIG. 3. In the first step of the process represented by box 80, the micropixel electrical signal inputs to diode laser(s) 38 are converted to light. The input variable is the modulated electrical current fed to each laser diode 38 as a function of time. The output variable is the light intensity of the diode(s) at the image plane (sheet 34) as a function of position and time. In the next step of the process, represented by box 82, the laser (e.g., infrared) light is absorbed in the black dye layer 76 (by the IR absorbing dye) and converted to heat. Preferably, exposure is through the dye layer side of the film so that most of the light is absorbed.

In the next step of the process represented by box 84, the heat flows throughout the exposed subpixel area setting up a temperature distribution. For a flat field exposure, a steady state condition is reached after a predetermined period of time. In the next step of the process represented by box 86, the heated dye ablates to leave a subpixel area without dye or a clear area. If the subpixel area is not exposed to laser light and subsequent heating, the subpixel area is left intact (i.e., a black area).

As represented by box 88 (FIG. 3), the image which is left after the dye has been evaporated is the dye that remains after the film cools to ambient temperature. The pattern remaining is the visual representation of the image supplied by image source 16 to printer 12. The dye which is ablated off the surface of the film needs to be removed or it may end up being deposited back onto the film or onto the printer lens. In the scavenging step represented by box 90, a vacuum draws off the evaporated dye vapor where it is trapped in an air filter. Thus, the vapor fumes are not vented to the environment. In addition, the evaporated dye vapor can be recycled.

In the following examples, a dye sheet was produced including a neutral combination of image dyes, (as described above) together with an IR absorbing dye, in a binder which was coated to an optical density of about 3.6, onto a clear 0.004 inch thick polyester substrate. An infrared diode laser emitting laser light at a wavelength of 820 nanometers was used to expose the dye sheet.

EXAMPLE 1

An ultrasound halftone image was used to print two halftone originals on the referenced dye coated film by the laser thermal dye ablation process described above. This was then used as an original, or master, and duplicate copies were then made by contact printing onto high-contrast graphic arts-type photographic film (KODAK Ultratek UGF film supplied by Eastman Kodak Company of Rochester, New York). The duplicate copies thus produced were clear, sharp, high-contrast, very nearly perfect duplicates of the original ultrasound image.

EXAMPLE 2

CT (Computerized Tomography) scan data was used to print two halftone originals on dye coated film, as described above. In this case both a positive and a negative original were made, by reversing the color of the black and white micro-pixels (exchanging 1's and 0's in the digital data). These were then used to make duplicates by contact printing onto high-contrast graphic arts-type photographic film (KODAK Ultratec UGF). Both positive and negative duplicates were made. Again, the copies made were clear, sharp, faithful, duplicates of the original.

EXAMPLE 3

Ultrasound abdomen scan data was used to print a halftone original by the laser thermal dye ablation process described above. The halftone original was a negative. Contact exposures were made onto a dye sensitized, homogeneous photoconductive film which was positively charged. Images were made using neg/pos development and small particle (3 microns) toner (having 12% carbon) to obtain positive duplicates of the ultrasound image. The duplicates were high-contrast reproductions, and the maximum density obtained was high, about 2.85.

It should be noted that the exposure speed of the photographic or electrophotographic film used for duplicating is vastly higher than that of the typical laser thermal film requiring an exposure for imaging on the order of 1–100 ergs per square cm., as opposed to 1,000,000 ergs per square cm. in the typical thermal case. Thus, the reproductions may be made rapidly, with a very low exposure required.

It should also be noted that in the case of electrophotographic duplicating, the developed toner layer may be transferred to another receiver by, for example, overcoat transfer from a single use photoconductor, electrostatic transfer, or thermal transfer. Thus, duplicate copies may be made on any desirable receiver sheet such as a reflective receiver.

TECHNICAL EFFECT AND ADVANTAGES

The present invention has the following advantages:

1. Duplicates of medical, radiographic, or other high quality and/or high resolution continuous tone images may be made rapidly and/or cheaply.
2. The duplicating medium may be a high-contrast black-or-white medium.
3. Both positive or negative duplicates may be made.
4. Both magnified or demagnified duplicates may be made.
5. By using photographic or electrophotographic duplicating media for the duplicating process, the exposure required for copying may be much reduced over that required, for example, for thermal recording.
6. Duplicating media with any desirable properties may be used, for example, reflective media.
7. When a dry copying process such as xerography is used, the entire duplicating process is free of the need for wet chemical processing, plumbing, and disposal of effluents.
8. By changing the parameters of the digital halftone screening algorithms, halftone masters with any suitable properties may be produced. For example, screening parameters may be chosen which are suitable for making copies using an ordinary xerographic copying machine.

Although the invention has been described with reference to preferred embodiments thereof, it will be understood that variations and modifications can be effected within the spirit and scope of the invention as described above and as defined in the appended claims.

What is claimed is:

1. A method for duplicating continuous tone black and white images comprising the steps of:

providing a continuous tone black and white image signal including a matrix of pixels;

screening said black and white image signal with a digital halftone screen, such that each pixel of said image signal is represented by a predetermined matrix of micro-pixels, whereby to produce a digital halftone image signal corresponding to said continuous tone black and white image signal;

creating a finished master by printing said digital halftone image onto a dye coated solid medium by means of laser thermal recording;

placing said finished master into contact with a duplicating medium; and producing a duplicate of said master by contact printing onto said duplicating medium by exposing said master and said duplicating medium to light.

2. The method of claim 1 wherein said providing step provides an image signal from a medical imaging source.

3. The method of claim 1 wherein said providing step provides an image signal from a storage phosphor reader.

4. The method of claim 1 wherein said providing step provides an image signal from a film digitizer.

5. The method of claim 1 wherein said creating step includes the steps of modulating a laser light source with said digital halftone image signal, scanning said modulated laser light in a matrix pattern on dye ablation media to produce said master.

6. The method of claim 5 wherein said scanning step includes moving said dye ablation media in a page scan direction while scanning said laser light in a line scan direction across said media.

7. The method of claim 5 wherein said modulating step includes modulating a plurality of laser light sources with said digital halftone image signal.

8. The method of claim 1 wherein said producing step produces a duplicate on photosensitive duplicating media which is processed by standard photographic processing techniques.

9. The method of claim 1 wherein said processing step produces a duplicate on electrophotographic media which is processed by electrophotographic developing techniques.

10. Apparatus for duplicating continuous tone black and white images comprising:

an image signal source of a continuous tone black and white image signal including a matrix of pixels;

a screener for screening said black and white image signal with a digital halftone screen, such that each pixel of said image signal is represented by a predetermined matrix of micro-pixels, whereby to produce a digital halftone image signal corresponding to said continuous tone black and white image signal;

a printer for creating a finished master by printing said digital halftone image onto a dye coated solid medium by means of laser thermal recording;

a duplicator for producing a duplicate of said master by contact printing onto a duplicating medium by exposing said master and said duplicating medium to light; and means for transferring said finished master from said printer to said duplicator to bring said master into contact with said duplicating medium.

11. The apparatus of claim 10 wherein said image signal source is a medical image signal source.

12. The apparatus of claim 11 wherein said medical image source is a diagnostic imaging modality.

13. The apparatus of claim 11 wherein said medical image signal source is a storage phosphor reader.

14. The apparatus of claim 10 wherein said image signal source is a film scanner.

15. The apparatus of claim 14 wherein said film scanner is a radiographic film scanner.

16. The apparatus of claim 10 wherein said printer includes a laser light source, a modulator for modulating said laser light source with said digital halftone image signal, and a scanner for scanning said modulated laser light in a matrix pattern on dye ablation media to produce said master.

17. The apparatus of claim 16 wherein said scanner includes a page scanner for moving said media in a page direction and a line scanner for scanning said modulated light in a line scan direction across said media.

18. The apparatus of claim 16 wherein said laser light source includes a plurality of laser light sources which are simultaneously modulated by said digital halftone signal.

* * * * *